(12) United States Patent
Hsieh et al.

(10) Patent No.: US 10,845,915 B2
(45) Date of Patent: Nov. 24, 2020

(54) ELECTRONIC APPARATUS AND METHOD FOR SWITCHING TOUCH MODE THEREOF

(71) Applicant: PEGATRON CORPORATION, Taipei (TW)

(72) Inventors: Min-Shao Hsieh, Taipei (TW); Chih-Yung Li, Taipei (TW); Chien-Hsiang Chen, Taipei (TW); Jing-Rung Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/245,012

(22) Filed: Jan. 10, 2019

(65) Prior Publication Data
US 2019/0212866 A1    Jul. 11, 2019

(30) Foreign Application Priority Data

Jan. 11, 2018   (TW) .............................. 107101118 A (51) Int. Cl.
*G06F 3/041*     (2006.01)
*G06F 1/3212*    (2019.01)

(52) U.S. Cl.
CPC .......... *G06F 3/0416* (2013.01); *G06F 1/3212* (2013.01)

(58) Field of Classification Search
USPC .................. 345/168, 173, 174, 156; 600/28; 178/18.06; 361/283.1
See application file for complete search history.

(56) References Cited

U.S. PATENT DOCUMENTS

| 2004/0207606 | A1* | 10/2004 | Atwood ................. G06F 3/045 345/173 |
| 2009/0195959 | A1* | 8/2009 | Ladouceur ............. G06F 3/044 361/283.1 |
| 2009/0284478 | A1* | 11/2009 | De la Torre Baltierra .................. G06F 3/04883 345/173 |
| 2010/0271307 | A1* | 10/2010 | Yen ........................ G06F 1/1643 345/168 |
| 2011/0061949 | A1* | 3/2011 | Krah ...................... G06F 3/0418 178/18.06 |
| 2012/0044188 | A1* | 2/2012 | Prendergast .......... G06F 3/0416 345/174 |
| 2013/0314328 | A1* | 11/2013 | Singer ................... G06F 3/0488 345/173 |

(Continued)

FOREIGN PATENT DOCUMENTS

| CN | 103179238 | 6/2013 |
| JP | 2000132338 | 5/2000 |

(Continued)

*Primary Examiner* — Thuy N Pardo
(74) *Attorney, Agent, or Firm* — J.C. Patents (57) ABSTRACT

An electronic apparatus and a method for switching touch modes thereof are provided. A touch screen of the electronic apparatus has a plurality of touch modes. A current touch mode of the touch screen is one of the plurality of touch modes. The method includes the following steps. Firstly, the number of times a key module of the electronic apparatus is pressed is determined according to a pulse count of a trigger signal provided by the key module. Next, a first touch mode of the plurality of touch modes is looked up in a lookup table according to the number of times. Afterwards, the current touch mode of the touch screen is switched to the first touch mode.

6 Claims, 6 Drawing Sheets

(56) References Cited

U.S. PATENT DOCUMENTS

| | | | |
|---|---|---|---|
| 2013/0314382 A1* | 11/2013 | Fukushima et al. | ........................ G06F 3/03545 345/179 |
| 2014/0107401 A1* | 4/2014 | Anderson | ............. A61M 21/00 600/28 |
| 2014/0285467 A1* | 9/2014 | Prendergast | .......... G06F 3/0416 345/174 |
| 2015/0084900 A1* | 3/2015 | Hodges | ................. G06F 1/1632 345/173 |
| 2016/0062494 A1* | 3/2016 | Zuber | .................... G06F 3/0418 345/173 |
| 2016/0098116 A1* | 4/2016 | Park | ...................... G06F 3/0418 345/174 |
| 2016/0378263 A1* | 12/2016 | Krah | .................... G06F 3/0418 345/174 |

FOREIGN PATENT DOCUMENTS

| | | |
|---|---|---|
| JP | 2013246661 | 12/2013 |
| JP | 2014099200 | 5/2014 |
| TW | 200627245 | 8/2006 |
| TW | 201011610 | 3/2010 |
| TW | I335538 | 1/2011 |

\* cited by examiner

ELECTRONIC APPARATUS AND METHOD FOR SWITCHING TOUCH MODE THEREOF

CROSS-REFERENCE TO RELATED APPLICATION

This application claims the priority benefit of Taiwan application serial no. 107101118, filed on Jan. 11, 2018. The entirety of the above-mentioned patent application is hereby incorporated by reference herein and made a part of this specification.

BACKGROUND

Technical Field

The disclosure relates to a touch technology, particularly, the disclosure relates to a method for switching touch modes and an electronic apparatus using the method.

Description of Related Art

With the development of the touch technology, the touch screen of the electronic apparatus usually supports a plurality of touch modes, such as a hand touch mode, a rain mode, a touch pen mode, or a glove mode, etc., so as to increase the flexibility of the electronic apparatus in use. However, when a user wants to switch the touch modes of the touch screen, the user usually has to search for an application program of the touch mode that the user would like to use in the operating system of the electronic apparatus and runs the application program the first touch mode of the plurality of touch modes, so that the touch screen may be successfully switched to the touch mode that the user would like to use.

For example, when the user wants to switch the touch modes of the touch screen from the "hand touch mode" to the "rain mode", the user has to search for an application program of the "rain mode" in the operating system of the electrical device and runs the application program of the "rain mode" be executed, so that the touch screen operates in the "rain mode". However, it is inconvenient that the user has to perform the above operation again every time the user wants to switch the touch modes of the touch screen.

SUMMARY

In view of the above, the disclosure provides an electronic apparatus and a method for switching the touch modes thereof, and it is more convenient for the user to switch the touch modes of the electronic apparatus.

The electronic apparatus of the disclosure includes a touch screen, a key module, and a controller. The touch screen has a plurality of touch modes. A current touch mode of the touch screen is one of the plurality of touch modes. The key module has a key. The key module generates a trigger signal in response to a press of the key. The controller is coupled to the touch screen to receive the trigger signal. The controller determines the number of times that the key is pressed according to a pulse count of the trigger signal, looks up a first touch mode of the plurality of touch modes in a lookup table according to the number of times that the key is pressed, and switches from the current touch mode of the touch screen to the first touch mode.

A method for switching touch modes of the disclosure is configured to switch the plurality of touch modes of the touch screen of the electronic apparatus, and the current touch mode of the touch screen is one of the plurality of touch modes. The method for switching touch modes includes the following steps. Firstly, the number of times the key module is pressed is determined according to a pulse count of a trigger signal provided by a key module of the electronic apparatus. Next, the first touch mode of the plurality of touch modes is looked up in a lookup table according to the number of times that the key module is pressed. Afterwards, the current touch mode of the touch screen is switched to the first touch mode.

To sum up, in the electronic apparatus and the touch mode switching method thereof of the disclosure, the controller may automatically switch the current touch mode of the touch screen according to the number of times that the key is pressed so that the convenience for using the electronic apparatus is improved.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In order to make the content of the disclosure easier to understand, the following specific examples are examples of how the disclosure can be implemented. In addition, wherever possible, the same reference numerals are used in the drawings and embodiments represent the same or similar parts.

Figure 1:
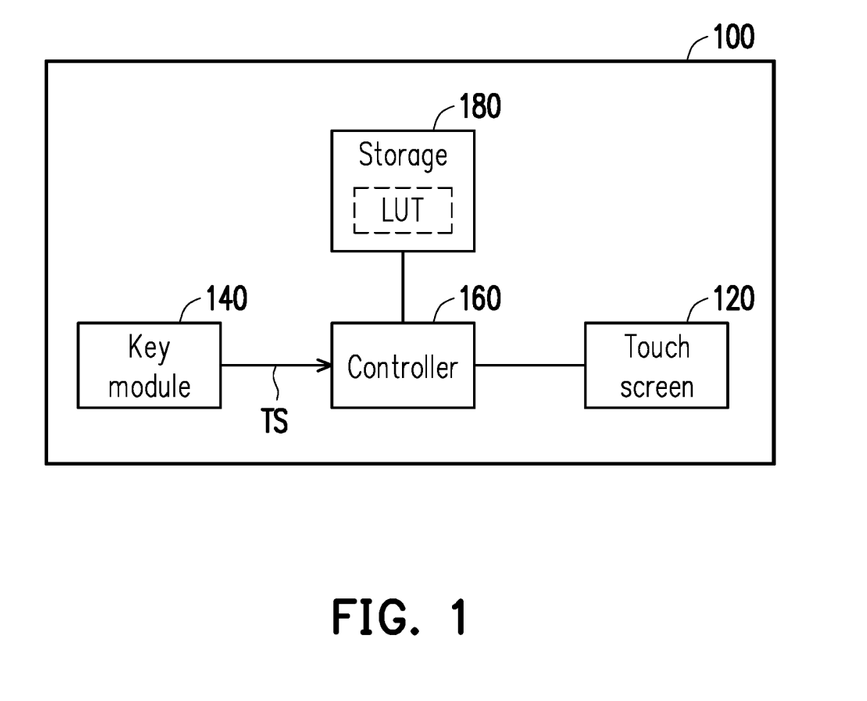
FIG. 1 is a circuit block diagram illustrating an electronic apparatus according to an embodiment of the disclosure.

Please refer to FIG. 1. FIG. 1 is a circuit block diagram illustrating an electronic apparatus according to an embodiment of the disclosure. The electronic apparatus 100 may include a touch screen 120, a key module 140, a controller 160, and a storage 180. However, the disclosure is not limited to this. In another embodiment of the disclosure, the storage 180 also may be integrated to the controller 160. The touch screen 120 may have a plurality of touch modes, such as a "hand touch mode", a "rain mode", a "stylus mode", or a "glove mode", etc., but the disclosure is not limited to this. The key module 140 has a key (e.g. a physical key). The key module 140 may generate a trigger signal TS in response to a press of the key.

The controller 160 is coupled to the touch screen 120 to set a current touch mode of the touch screen 120 as one of the plurality of touch modes mentioned above. The controller 160 is coupled to the storage 180. The controller 160 may establish a lookup table LUT according to the plurality of touch modes mentioned above and store the lookup table LUT in the storage 180. In addition, the controller 160 is coupled to the key module 140 to receive the trigger signal TS. The controller 160 determines the number of times the key of the key module 140 is pressed according to the trigger signal TS, the controller 160 looks up a corresponding first touch mode among the plurality of touch modes in the lookup table LUT according to the number of times that the key is pressed, and the controller 160 switches from the current touch mode of the touch screen 120 to the first touch mode.

In an embodiment of the disclosure, the lookup table LUT may include a plurality of index values and the plurality of touch modes mentioned above, where each of the plurality of touch modes corresponds to one of the plurality of index values. The operation of the electronic apparatus 100 will be described in details below with reference to FIG. 1 and FIG. 2.

Figure 2:
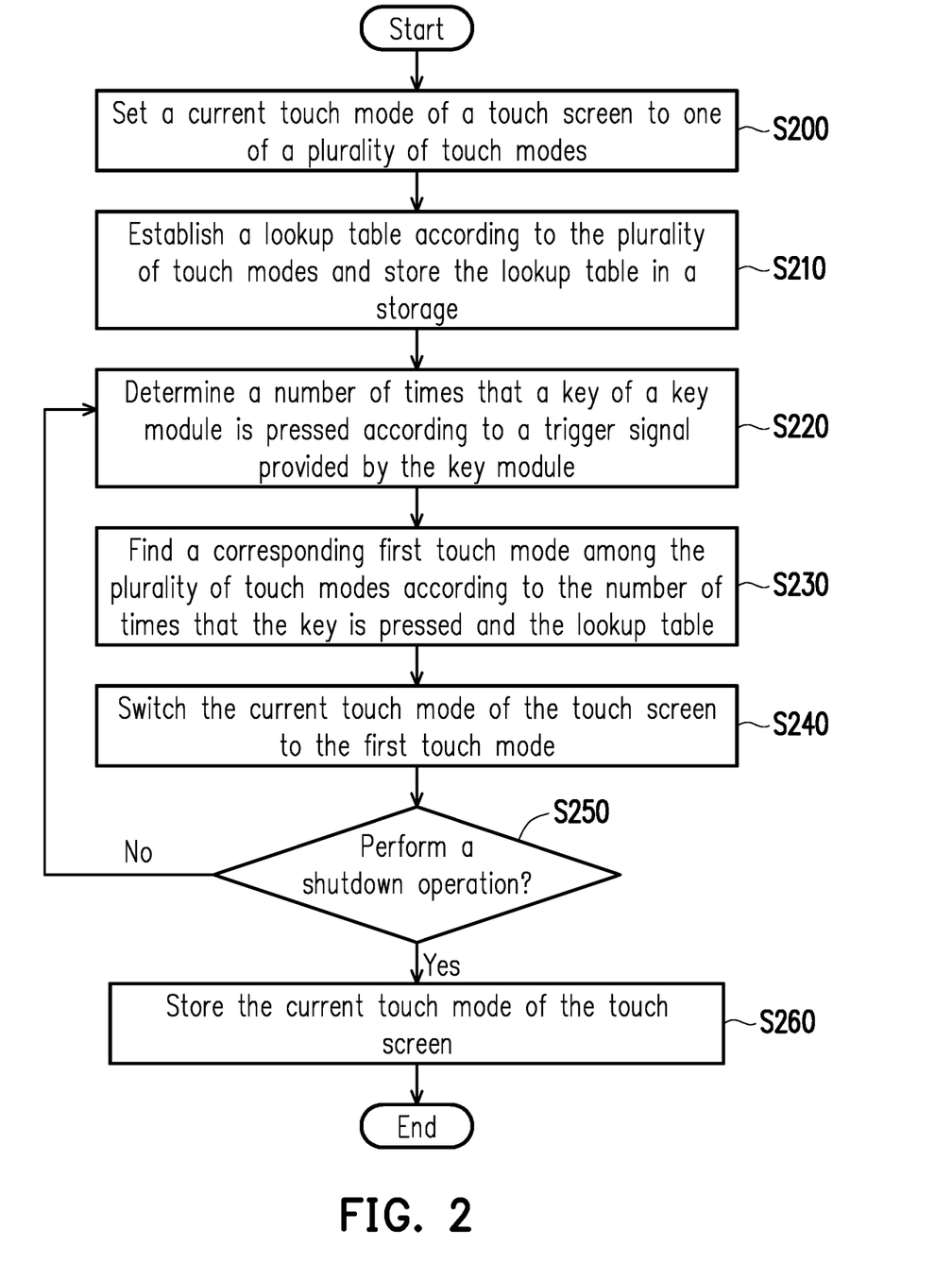
FIG. 2 is a flow chart illustrating steps of a method for switching touch modes according to an embodiment of the disclosure.

Please refer to FIG. 1 and FIG. 2 together. FIG. 2 is a flow chart illustrating steps of a method for switching touch modes according to an embodiment of the disclosure, which may be applied to the electronic apparatus 100 in FIG. 1, but the disclosure is not limited thereto. First of all, in step S200, the current touch mode of the touch screen 120 is set to one of the plurality of touch modes (for example, the current touch mode may be the "hand touch mode", but not limited thereto). Further, in an embodiment of the disclosure, step S200 may include the following detailed step in which the current touch mode of touch screen 120 is set to a default touch mode when the electronic apparatus 100 performs a boot operation. How the default touch mode is determined would be described later.

After that, in step S210, a lookup table LUT may be established by the controller 160 according to the plurality of touch modes mentioned above and stored in the storage 180, but the disclosure is not limited thereto. In another embodiment of the disclosure, the lookup table LUT may also be pre-established and stored in the storage 180 rather than established by the controller 160, and therefore step S210 can be omitted. In another embodiment of the disclosure, the execution sequence between step S200 and step S210 is interchanged, i.e. step S210 can be executed before step S200.

Then, in step S220, the number of times that the key of the key module 140 is pressed is determined by the controller 160 according to the trigger signal TS provided by the key module 140. Then, in step S230, the corresponding first touch mode (for example, the "glove mode", but not limited thereto) is found by the controller 160 among the plurality of touch modes according to the number of times that the key is pressed and the lookup table LUT. Afterwards, in step S240, the current touch mode of the touch screen 120 is switched by the controller 160 to the first touch mode (for example, the current touch mode is switched from the "hand touch mode" to the "glove mode").

Next, in step S250, the controller 160 determines whether the electronic apparatus 100 performs a shutdown operation. If the result of the determination in step S250 is no, then return to step S220. On the contrary, if the result of the determination in step S250 is yes, the current touch mode of the touch screen 120 may be stored as shown in step S260. Thus, the controller 160 may set the default touch mode as the current touch mode of the touch screen 120 when the electronic apparatus 100 is turned on and performs the boot operation next time. For instance, if the current touch mode of the touch screen 120 is the "rain mode" when the electronic apparatus 100 performs the shutdown operation, then the default touch mode may be set to the "rain mode". Therefore, the controller 160 may set the "rain mode" as the current touch mode of the touch screen 120 when the electronic apparatus 100 is turned on and performs the boot operation next time.

In other embodiment of the disclosure, every time when the electronic apparatus 100 is powered on and performs the boot operation, the current touch mode of the touch screen 120 may be always set to one of the aforementioned four touch modes, such that step S260 may be omitted.

In general, the user only has to press the key of the key module 140 so that the electronic apparatus 100 may automatically switch the current touch mode of the touch screen 120 according to the number of times that the key is pressed, and thereby the convenience of using the electronic apparatus 100 is improved.

Figure 3:
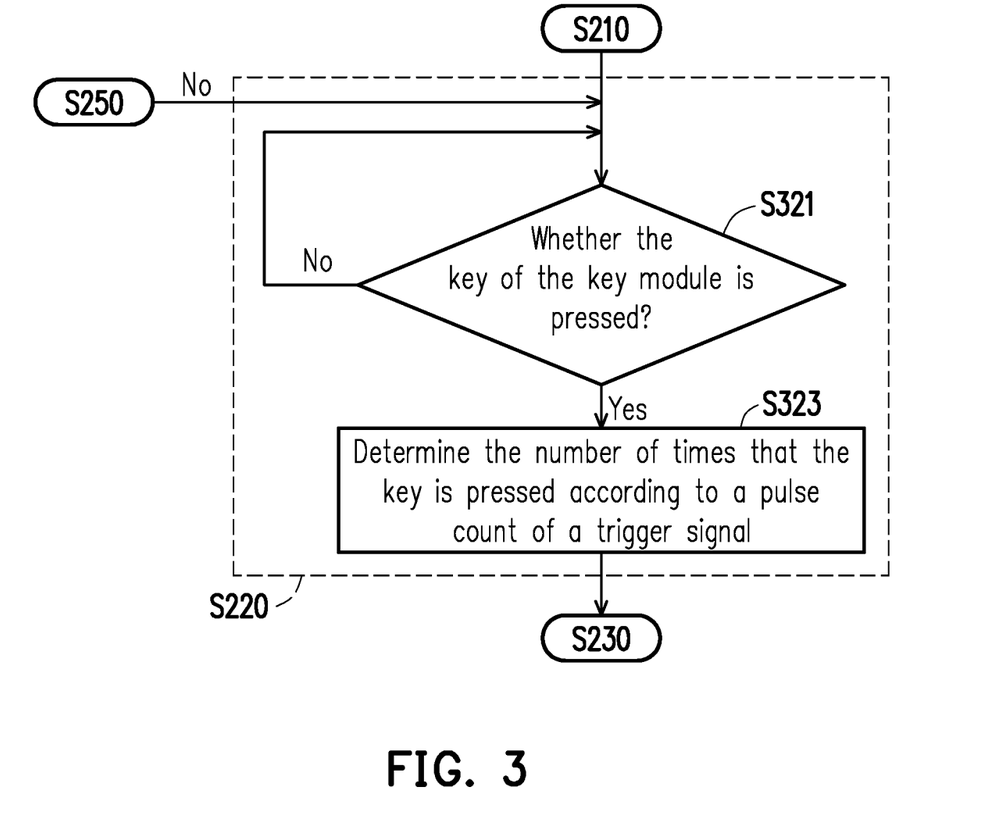
FIG. 3 is a flow chart illustrating detailed steps of step S220 in FIG. 2 according to an embodiment of the disclosure.
Figure 4:
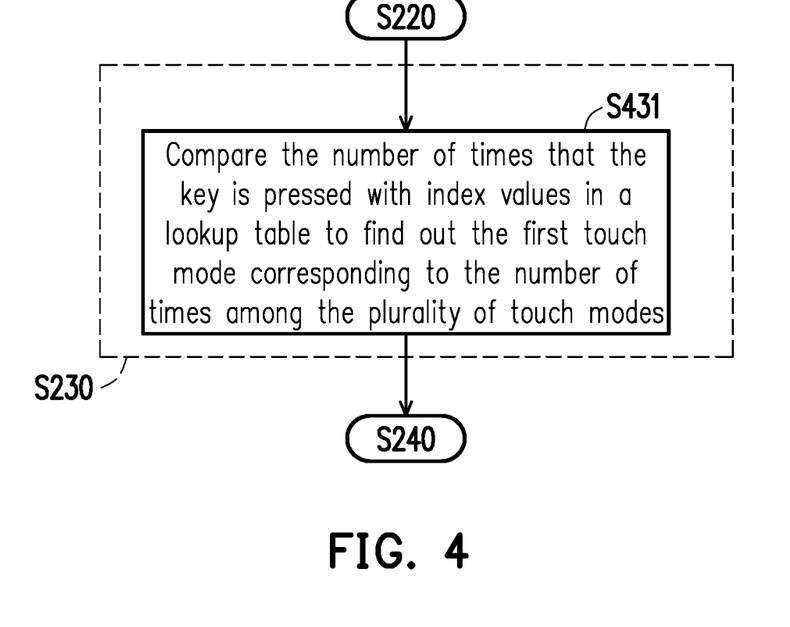
FIG. 4 is a flow chart illustrating detailed steps of step S230 in FIG. 2 according to an embodiment of the disclosure.

Please refer to FIG. 1~FIG. 4 together. FIG. 3 is a flow chart illustrating detailed steps of step S220 in FIG. 2 according to an embodiment of the disclosure, and FIG. 4 is a flow chart illustrating detailed steps of step S230 in FIG. 2 according to an embodiment of the disclosure. As shown in FIG. 3, in step S321, the trigger signal TS provided by the key module 140 determines whether the key of the key module 140 is pressed and a determining result is obtained. For instance, the key module 140 may generate the trigger signal TS with a pulse in response to a press of the key. Therefore, the controller 160 may immediately determine whether the key of the key module 140 is pressed according to changes of the voltage level of the trigger signal TS. In detail, when a first pulse occurs in the trigger signal TS, the controller 160 may detect that the voltage level of the trigger signal TS changes, such as changing from a first level (e.g., a logic low level) to a second level (e.g., a logic high level), so that the controller 160 determines that the key of the key module 140 is pressed.

If the determining result in step S321 is no (i.e., the voltage level of the trigger signal TS is not changed), then the controller 160 stays at step S321 to continuously monitor whether the key of the key module 140 is pressed. If the determining result in step S321 is yes (i.e., the voltage level of the trigger signal TS is changed), the controller 160 may count the number of the rising edge or the falling edge of the trigger signal TS to obtain a pulse count of the trigger signal TS, and the controller 160 may determine the number of times that the key is pressed according to the pulse count of the trigger signal TS as shown in step S323. Moreover, if the determining result in step S250 in FIG. 2 is no, step S321 is performed.

The detailed descriptions of step S230 are described below. As shown in FIG. 4, in step S431, the number of times that the key is pressed may be compared with the index values in the lookup table LUT to find out the first touch mode corresponding to the number of times among the plurality of touch modes.

For example, it is assumed that the touch screen 120 has four touch modes such as the "hand touch mode", the "rain mode", the "stylus mode", and the "glove mode". The controller 160 may establish the lookup table LUT as shown in Table 1 according to the above four touch modes, where the "hand touch mode", the "rain mode", the "stylus mode", and the "glove mode" are correspond to the index values "1", "2", "3", and "4", respectively. In addition, the current touch mode of the touch screen 120 is set to the "hand touch mode".

TABLE 1

| Index values | Type of the touch mode |
| --- | --- |
| 1 | hand touch mode |
| 2 | rain mode |
| 3 | stylus mode |
| 4 | glove mode |

Under the above circumstance, if the user presses the key of the key module 140 twice, the controller 160 may compare the number of times that the key is pressed (i.e., twice) with the index values in Table 1 to find out the "rain mode" corresponding to the index values "2" from the four touch modes and set the "rain mode" as the first touch mode. In this way, the controller 160 switches the current touch mode of the touch screen 120 from the "hand touch mode" to the "rain mode". Similarly, if the user presses the key of the key module 140 three times (or four times), the controller 160 switches the current touch mode of the touch screen 120 to the "touch pen mode" (or the "glove mode"). In addition, if the user presses the key of the key module 140 five times or more, the touch screen 120 may display an error message, and the controller 160 may maintain the current touch mode of the touch screen 120 in the "hand touch mode".

Figure 5:
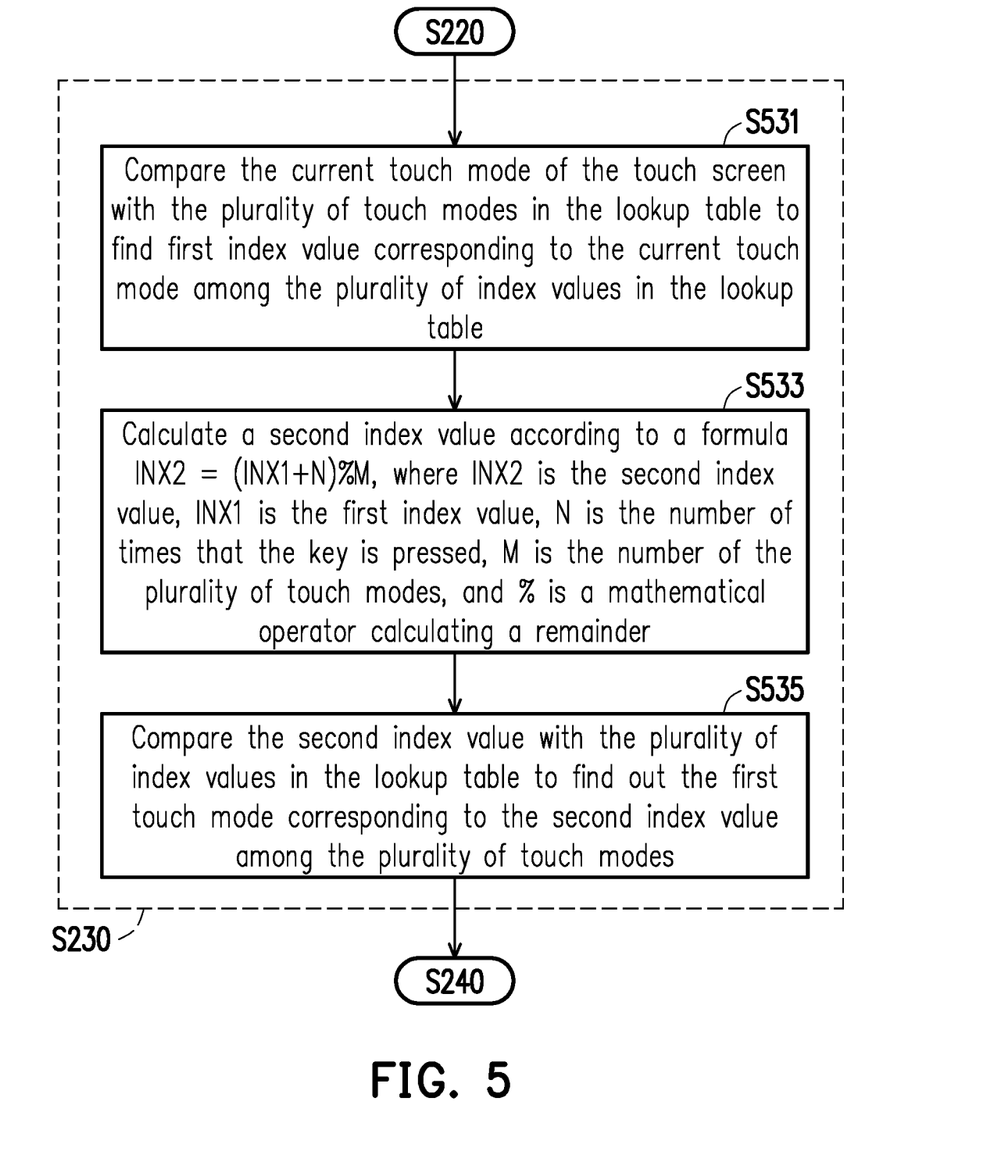
FIG. 5 is a flow chart illustrating detailed steps of step S230 in FIG. 2 according to another embodiment of the disclosure.

Please refer to FIG. 1, FIG. 2, and FIG. 5 together. FIG. 5 is a flow chart illustrating detailed steps of step S230 in FIG. 2 according to another embodiment of the disclosure. As shown in FIG. 5, in step S531, the current touch mode of the touch screen 120 may be compared with the plurality of touch modes in the lookup table LUT to find out a first index value corresponding to the current touch mode among the plurality of index values of the lookup table LUT. Then, in step S533, a second index value may be calculated according to the following formula (1), where INX2 in formula (1) is the second index value, INX1 is the first index value, N is the number of times that the key is pressed, M is the number of the plurality of touch modes, and % is a mathematical operator calculating a remainder. After that, in step S535, the second index value may be compared with the plurality of index values in the lookup table LUT to find out the first touch mode corresponding to the second index value among the plurality of touch modes.

$$INX2=(INX1+N)\% M \quad \text{formula (1)}$$

For example, the following description is also assumed that the touch screen 120 has four touch modes such as the "hand touch mode", the "rain mode", the "stylus mode", and the "glove mode" (i.e., M of the formula (1) is 4). The controller 160 may establish the lookup table LUT as shown in Table. 2 according to the above four touch modes, where the "hand touch mode", the "rain mode", the "stylus mode", and the "glove mode" correspond to the index values "0", "1", "2", and "3", respectively. Besides, the current touch mode of the touch screen 120 is set to the "stylus mode", so that the controller 160 may find out that the first index value corresponding to the current touch mode (i.e., the "touch pen mode") in Table 2 is "2".

TABLE 2

| index values | Type of the touch mode |
| --- | --- |
| 0 | hand touch mode |
| 1 | rain mode |
| 2 | touch pen mode |
| 3 | glove mode |

When the current touch mode is the "stylus mode", if the user presses the key of the key module 140 once (or 5 times), the controller 160 substitutes the first index value INX1 with 2, the number of times N with 1 (or 5), and the number of the plurality of touch modes M with 4 in the above formula (1) and obtains the second index value INX2 equal to 3. Next, the controller 160 compares the second index value with the index values in Table 2 to find out the "glove mode" corresponding to the second index value of "3" among the four touch modes, and the controller 160 sets the "glove mode" as the first touch mode. Afterwards, the controller 160 may switch the current touch mode of the touch screen 120 from the "touch pen mode" to the "glove mode".

In addition, when the current touch mode is the "touch pen mode", if the user presses the key of the key module 140 twice (or 6 times), the controller 160 substitutes the second index value INX2 with 2, the number of times N with 2 (or 6), and the number of the plurality of touch modes M with 4 in the above formula (1) and obtains the second index value INX2 equal to 0 in the above formula (1). Next, the controller 160 compares the second index value with the index values in Table 2 to find out the "hand touch mode" corresponding to the second index value of "0" among the four touch modes, and the controller 160 sets the "hand touch mode" as the first touch mode. Afterwards, the controller 160 may switch the current touch mode of the touch screen 120 from the "touch pen mode" to the "hand touch mode".

It should be understood that the current touch mode of the touch screen 120 could be circularly switched among the above four touch modes by pressing the key of the key module 140.

Figure 6:
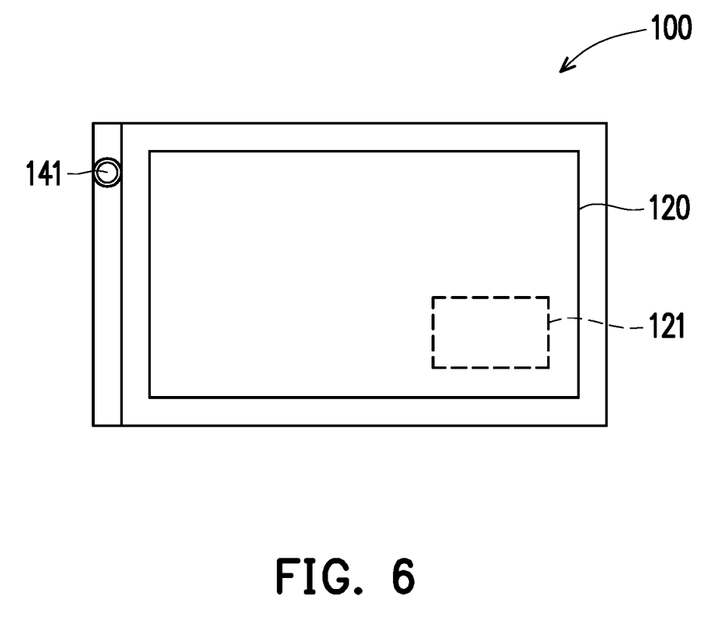
FIG. 6 is a schematic diagram illustrating an appearance of the electronic apparatus in FIG. 1 according to an embodiment of the disclosure.

Please refer to FIG. 1 and FIG. 6 together. FIG. 6 is a schematic diagram illustrating an appearance of the electronic apparatus in FIG. 1 according to an embodiment of the disclosure. The key 141 (e.g., a physical key) of the key module 140 may be disposed on one side of the electronic apparatus 100. When the user presses the key 141 to switch the current touch mode of the touch screen 120, the controller 160 temporarily displays the current touch mode of the touch screen 120 on a specific display area 121 of the touch screen 120, such that the user could know the current touch mode of the touch screen 120. For example, if the current touch mode of the touch screen 120 is switched from the "hand touch mode" to the "rain mode", the controller 160 temporarily displays the "rain mode" on the specific display area 121 of the touch screen 120.

In summary, in the electronic apparatus and the method for switching touch modes thereof according to the embodiment of the disclosure, the controller automatically switches the current touch mode of the touch screen according to the number of times that the key is pressed. Therefore, the user does not need to search the application program of the touch mode in the operating system of the electronic apparatus and then run the application program, so that it is more convenient for the user to switch the touch modes of the electronic apparatus.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for switching touch modes, configured to switch a plurality of touch modes of a touch screen of an electronic apparatus, a current touch mode of the touch screen being one of the plurality of touch modes, and the method comprising:

establishing a lookup table according to the plurality of touch modes and storing the lookup table in a storage of the electronic apparatus, wherein the lookup table comprises a plurality of index values and the plurality of touch modes, each of the plurality of touch modes corresponds to one of the plurality of index values;

determining the number of times a key module of the electronic apparatus is pressed according to a pulse count of a trigger signal provided by the key module;

looking up a first touch mode of the plurality of touch modes in the lookup table according to the number of times that the key module is pressed; and switching from the current touch mode of the touch screen to the first touch mode;

wherein the step of looking up the first touch mode of the plurality of touch modes in the lookup table according to the number of times the key module is pressed comprises:

searching for the current touch mode among the plurality of touch modes and obtaining a first index value corresponding to the current touch mode among the plurality of index values;

calculating a second index value according to a formula $INX2=(INX1+N) \% M$, wherein INX2 is the second index value, INX1 is the first index value, N is the number of times that the key module is pressed, M is the number of the plurality of touch modes, and % is a mathematical operator calculating a remainder; and comparing the second index value with the plurality of index values to find the first touch mode corresponding to the second index value among the plurality of touch modes.

2. The method for switching touch modes as claimed in claim 1, wherein the step of looking up the first touch mode of the plurality of touch modes in the lookup table according to the number of times the key module is pressed comprises:

comparing the number of times with the plurality of index values to find out the first touch mode corresponding to the number of times among the plurality of touch modes.

3. The method for switching touch modes as claimed in claim 1, further comprising:

storing the current touch mode of the touch screen when the electronic apparatus performs a shutdown operation; and setting the current touch mode of the touch screen as a default touch mode when the electronic apparatus performs a boot operation.

4. An electronic apparatus, comprising:

a touch screen having a plurality of touch modes, wherein a current touch mode of the touch screen is one of the plurality of touch modes;

a key module having a key and generating a trigger signal in response to a press of the key;

a controller coupled to the touch screen to receive the trigger signal, wherein the controller determines the number of times that the key is pressed according to a pulse count of the trigger signal, the controller looks up a first touch mode of the plurality of touch modes in a lookup table according to the number of times that the key is pressed, and the controller switches from the current touch mode of the touch screen to the first touch mode; and a storage coupled to the controller, wherein the controller establishes the lookup table according to the plurality of touch modes and stores the lookup table in the storage, wherein the lookup table comprises a plurality of index values and the plurality of touch modes, each of the plurality of touch modes corresponds to one of the plurality of index values, wherein the controller searches for the current touch mode among the plurality of touch modes and obtains a first index value corresponding to the current touch mode among the plurality of index values, the controller calculates a second index value according to a formula $INX2=(INX1+N) \% M$, wherein INX2 is the second index value, INX1 is the first index value, N is the number of times that the key is pressed, M is the number of the plurality of touch modes, and % is a mathematical operator calculating a remainder, and the controller compares the second index value with the plurality of index values to find out the first touch mode corresponding to the second index value among the plurality of touch modes.

5. The electronic apparatus as claimed in claim 4, wherein the controller compares the number of times with the plurality of index values to find out the first touch mode corresponding to the number of times among the plurality of touch modes.

6. The electronic apparatus as claimed in claim 4, wherein the controller stores the current touch mode of the touch screen when the electronic apparatus performs a shutdown operation, and the controller sets the current touch mode of the touch screen as a default touch mode when the electronic apparatus performs a boot operation.

* * * * *